United States Patent Office 3,257,491
Patented June 21, 1966

3,257,491
METHOD OF MANUFACTURING A BUILDING
MATERIAL
Eugene Smits, 44a Rue des Beguines,
Brussels 8, Belgium
No Drawing. Filed May 3, 1963, Ser. No. 277,723
Claims priority, application Belgium, May 18, 1962,
41,664, Patent 617,809; Jan. 24, 1963, 42,284,
Patent 627,481; Apr. 18, 1963, 42,553, Patent
631,203
3 Claims. (Cl. 264—331)

This invention relates to a material, which is novel both with respect to its particular texture and the outstanding wide range of applications it allows.

The object of the invention is truly to provide for those skilled in the art a material which may be used indifferently for the erection of outer and inner walls, fixed or removable partitions, while being also allowed to be used in frames, puggings, floors and other building parts.

Owing to its composition and texture, said material is relatively light and it has a good resistance to compression, flexion, yielding and shrinkage.

As a particularly novel feature determining a substantial progress in the building technics, this new product may be sawn, nailed, screwed, drilled, planed, milled, and so on, without splinters or burrs.

By this way, such elements may be secured by the most simple and economical means. Any necessary opening may be cut therein at any time and at any desired location. However, the most novel feature is truly found in that, owning to namely the millability of the product, any passage of any length and any shape may be economically, rapidly and readily grooved therein for housing any kind of pipes.

In addition, this product being in a manner self-weldable, it allows the rapid and complete realization of the whole filling and of any repair under such circumstances that the repaired portions have exactly the same texture as the element itself. By this way, after having milled a passage and housed a pipe therein, the filling of the said passage will be carried out by means of the proper constituting material of the element, this repair being then completely unapparent.

The homogeneity of the building elements, even after filling and repairing, is most important for applying and principally for holding the subsequent covering products such as coating and paints.

This novel building material is of the type consisting of at least a neutral filler and a synthetic resin binder. It is essentially characterized by the combination of a finely divided organic material, a polymerisable resin binder, an alumina silicate, water and occasionally additional fillers.

The polymerizable binder may be selected from the group consisting of any thermosetting synthetic resin having a high resistance at room temperature. The so called varnish resins may be also applied, such as the condensation products of phenol-glycerine mixtures, the acrolein derivatives, the glycerophthalic derivatives, the maleic derivatives of colophony, the polyvinyl alcohols, the urea-formaldehyde compounds, the mixtures of chlorinated derivatives of phenyl-benzene, the phenolic plastics, the condensation products of aniline-formaldehyde, the coumarone derivatives, the abieto and olephthalic derivatives, the vinyl acetates, the formaldehyde-phenols, the polymerized terpenes, the vinyl polymers, the glycerophthalics, the acrylic derivatives, the isobutylene polymers.

According to one of the essential characteristics of the invention, as alumina silicate acting as a catalyst, there will be used mixtures of alumina silicate, e.g. under the form of clay and particularly of kaolin.

As a neutral filler, there will be used finely divided wood sawdust or chips, preferably chips of resinous wood.

Finally, as an additional filler, there will be used any neutral product capable of imparting particular properties to the product, namely a high lightness. For this purpose, there will be used, e.g. vermiculite, expanded synthetic resins or some foams of synthetic material.

It is also very surprising that, by its very nature, the product allows the formation of a very wide range of various grades, so that those skilled in the art may very readily determine the quantitative and qualitative values of the different components according to the intended applications.

Example 1

| | Parts by weight |
|---|---|
| Urea-formaldehyde resin | 4 to 9 |
| Sawdust of resinous wood | 4 to 9 |
| Kaolin | 0.4 to 0.9 |
| Expanded resin | 0.4 to 0.9 |
| Water | 4 to 9 |

Example 2

| | Parts by weight |
|---|---|
| Neutral filler | 40 to 55 |
| Polymerizable binder | 10 to 30 |
| Catalyst | 4 to 11 |
| Catalyst carrier | 4 to 11 |
| Hardener | 1 to 0.5 |
| Water | 2.5 to 6 |

Example 3

| | Parts by weight |
|---|---|
| Urea-formaldehyde | 6 |
| Sawdust | 5 |
| Kaolin | 0.6 |
| Aprolite | 0.4 |
| Water | 7 |

Example 4
RELATIVELY DRY CLEAN

| | Parts by weight |
|---|---|
| Sawdust | 50 |
| Urea-formaldehyde resin | 20 |
| Kaolin | 6 |
| Vermiculite | 7.8 |
| Hardener | 0.7 |
| Water | 4 |

Example 5

| | Parts by weight |
|---|---|
| Wood sawdust | 24 |
| Kaolin | 2.5 |
| Vermiculite | 3.3 |
| Polymerizable resin | 8.5 |
| Hardener | 0.8 |

The invention relates also to a process for working this novel product. It comprises substantially introducing successively into the mixer, the neutral filler, e.g. the sawdust, the alumina silicate, the vermiculite or similar filler, water and, if desired, the hardener, when the same is not included in the resin.

These products are mixed thoroughly for a period in the range of, e.g. 15 minutes. Then, the polymerizable resin is added slowly thereto while the mixing operation is going on. The latter is continued until a quite homogeneous mass is obtained, i.e. for about some five minutes. Then, all the internal surfaces of the mould being lubricated, the said homogeneous mixture is introduced therein. The mass is distributed quite uniformly and the thickness as well as the framing corners are checked. The mass is subjected to a cold prepressure to bring the thickness to a dimension slightly higher than its final dimension.

This previous operation for a period of some five minutes. Then, a first hot pressure is applied, e.g. at a temperature in the range of 50 to 60° C. for some five minutes at a lower pressure, generally at a pressure equal to the half of the final pressure. Then, the mass is freed from the said pressure and the press is slightly released. Finally, the maximum pressure is applied at the highest temperature which is generally of about 100° C.

The pressure and the time of this final step are directly depending upon the nature of the used polymerizable resin and also upon the thickness or the shape of the realized parts.

It is then sufficient to proceed with stripping and to repeat the operation.

Parts realized by this way when applying the data of Example 5 mentioned hereabove have been subjected to various tests by the Test Laboratories of the Engineering Constructions and River Hydraulics of the Engineering Institute of the University of Liege.

Three samples under the form of cubes of 7 x 7 x 7 cm. have been subjected to a 60 tons Amsler press under load of 6 tons. Although the density of the product is only of about 0.450, the cracking load has reached more or less 1,500 kg. and the maximum load, 1.765 kg.

Although the so observed rate does not allow to consider the parts according to the invention as bearing parts of an outstanding quality, this result may be nevertheless found as being very surprising for such reduced density.

Samples of the same material having 33 x 10 x 7 cm. have been subjected to flexions by a 10 tons Amsler machine under a load of 500 kg. the samples being supported by bearing points 25 cm. distant from each other. The breaking load has been of 285 kg., which is also very outstanding for such light material.

Finally, the yielding resistance has been controlled on samples of 25 x 47 x 7 cm. also with the 60 tons Amsler machine under a load of 6 tons. The maximum load observed has been 4,220 kg.

From these tests, it results that the concerned product allows the realization of any semi-bearing parts, i.e. a product suitable for all the inner fixed or movable walls, for the filling of outer walls leaning on a strengthening framework, as well as for floors and ceilings, but of small width and relatively great thickness and leaning with their four corners on a suitable joisting.

Elements of any shape and substantially of any size such as blocks, solid or hollow panels or still shaped parts may be realized in accordance with the applications. Parts reinforced by means of rigid or flexible elements set under a previous stress or not, may be also realized.

The different components of the characteristical product have been only mentioned by way of example, being understood that any similar material or product, i.e. a product having the same function, may be substituted therefor.

Finally, the invention relates to the novel product, any element realized by means of said product as well as any building or building part using the said elements.

What I claim is:

1. A process for manufacturing a building material, comprising the following successive steps:
    (a) taking water, at least one finely divided organic material, alumina silicate, at least one additional filler from the group consisting of an expanded synthetic resin and a foam of plastic material, at least one hardener, and at least one resin polymerisable under the conjoined action of pressure and temperature rise;
    (b) intimately mixing said water, said finely divided organic material, said alumina silicate, said additional filler and said hardener to form a mass;
    (c) adding said polymerizable resin to the mass thus obtained and intimately mixing it therewith;
    (d) pouring the mass thus obtained into a mold of suitable shape and size;
    (e) subjecting the mass thus obtained to a cold pressing;
    (f) subjecting the mass thus obtained to a first hot pressing;
    (g) releasing the pressing;
    (h) subjecting the mass thus obtained to a second hot pressing.

2. A process according to claim 1, wherein said finely divided organic material is wood sawdust, wherein said resin is an urea-formaldehyde resin and wherein said alumina silicate is kaolin.

3. A process according to claim 1, wherein the various elements have a thickness of 7 cm.; wherein said first hot pressing is performed during about 5 minutes at a temperature of 50° C. to 60° C. and at a pressure of 60 kg./cm.$^2$, and wherein said second hot pressing is performed during 20 minutes at a temperature of about 100° C. and at a pressure of 150 kg./cm.$^2$ to 170 kg./cm.$^2$.

References Cited by the Examiner

UNITED STATES PATENTS

| | | | |
|---|---|---|---|
| 2,133,245 | 10/1938 | Brice et al. | 264—331 XR |
| 2,273,770 | 2/1942 | Nanfeldt | 264—331 |
| 2,328,290 | 8/1943 | Niederreither et al. | 264—109 XR |
| 2,378,322 | 6/1945 | Peterson | 264—331 XR |
| 2,385,721 | 9/1945 | Navikas | 264—331 |
| 2,440,789 | 5/1948 | Vander Pyl | 264—331 XR |
| 2,895,173 | 7/1959 | Atticks | 264—45 |
| 2,975,488 | 3/1961 | Brauner | 264—109 XR |
| 3,015,634 | 1/1962 | Ferrigno. | |
| 3,054,760 | 9/1962 | Worsley et al. | |

FOREIGN PATENTS 485,511   5/1938   Great Britain.

ROBERT F. WHITE, *Primary Examiner.*

ALEXANDER H. BRODMERKEL, *Examiner.*

P. E. ANDERSON, J. A. FINLAYSON,
*Assistant Examiners.*